United States Patent [19]

Makino

[11] Patent Number: 4,575,582
[45] Date of Patent: Mar. 11, 1986

[54] MOBILE RADIO COMMUNICATIONS SYSTEM

[75] Inventor: Masayuki Makino, Tokyo, Japan

[73] Assignee: NEC Corporation, Tokyo, Japan

[21] Appl. No.: 664,066

[22] Filed: Oct. 23, 1984

[30] Foreign Application Priority Data

Oct. 28, 1983 [JP] Japan ................. 58-202167

[51] Int. Cl.⁴ ............................................. H04Q 7/04
[52] U.S. Cl. .................... 179/2 EC; 179/2 E
[58] Field of Search .................. 179/2 E-2 EC

[56] References Cited

U.S. PATENT DOCUMENTS 4,408,099 10/1983 Ishii ........................... 179/2 EC
4,481,382 11/1984 Villa-Real .................. 179/2 EC X

FOREIGN PATENT DOCUMENTS 0126338 10/1981 Japan ................. 179/2 EC

Primary Examiner—W. J. Brady
Attorney, Agent, or Firm—Laff, Whitesel, Conte & Saret

[57] ABSTRACT

A mobile radio communications system for wide area mobile radio communications allows any two remote mobile stations to hold communications by way of a public switching network. A fixed station governing an area in which a calling mobile station is located sends to an exchange its own identification (ID) data and ID data associated with a mobile station which is connected to the fixed station by radio. Based on the two kinds of ID data, a called mobile station sees a telephone number assigned to the calling mobile station and a telephone number assigned to the fixed station which is associated with the calling mobile station.

3 Claims, 15 Drawing Figures

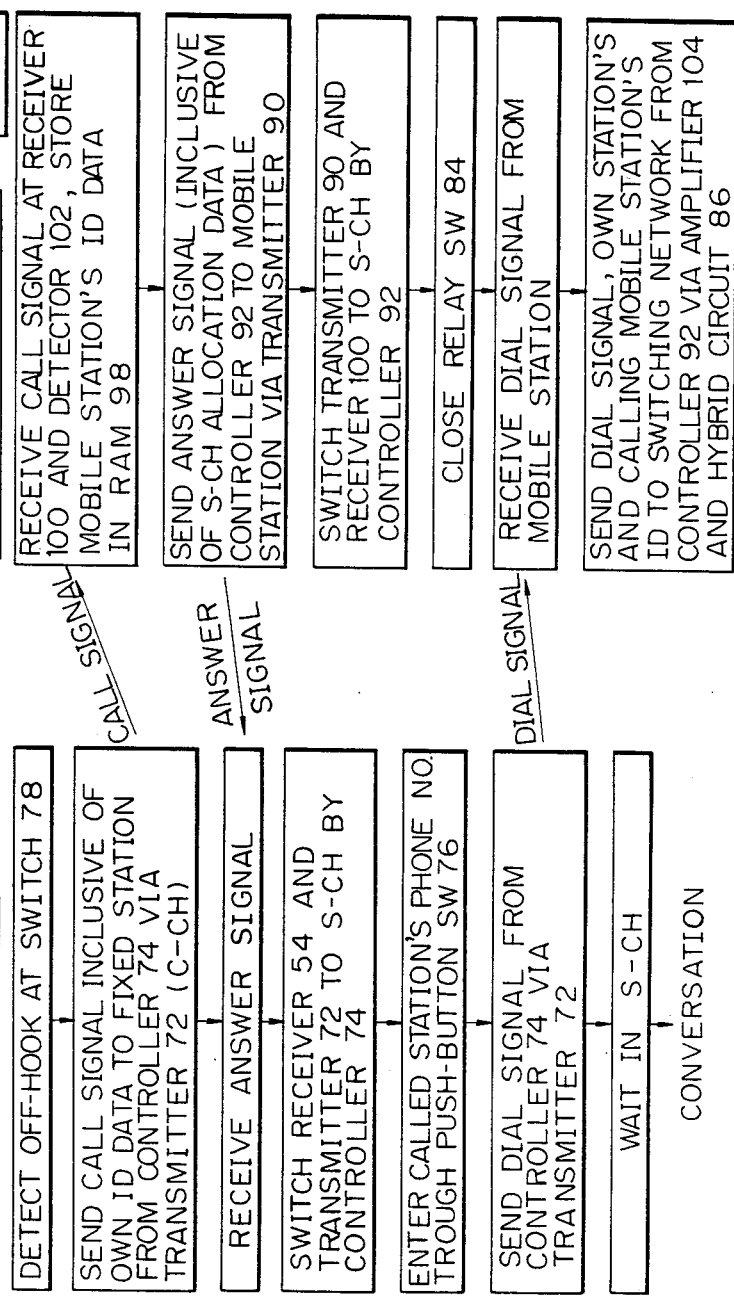

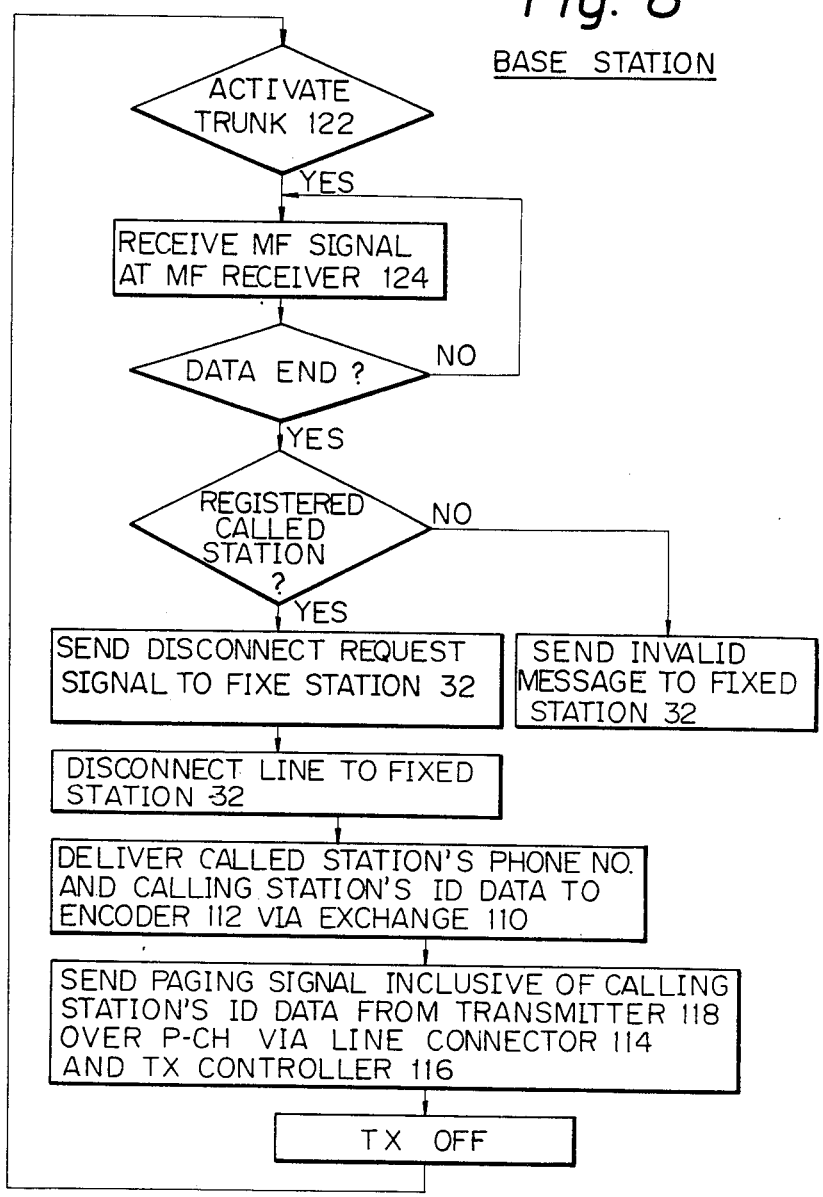

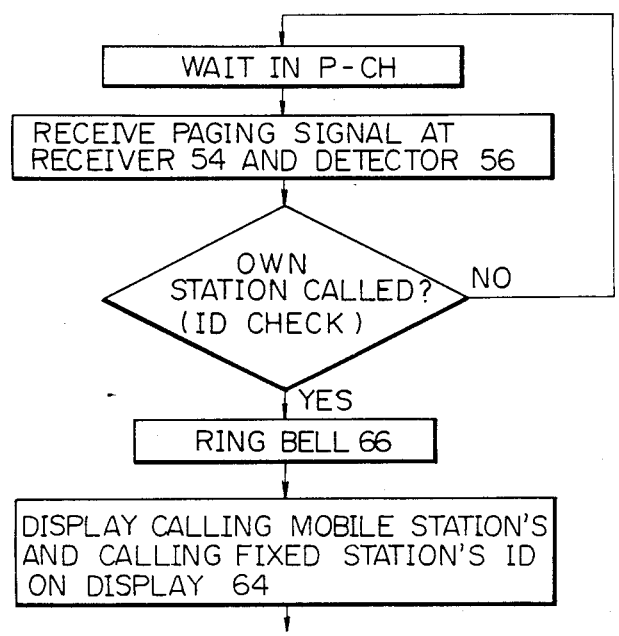

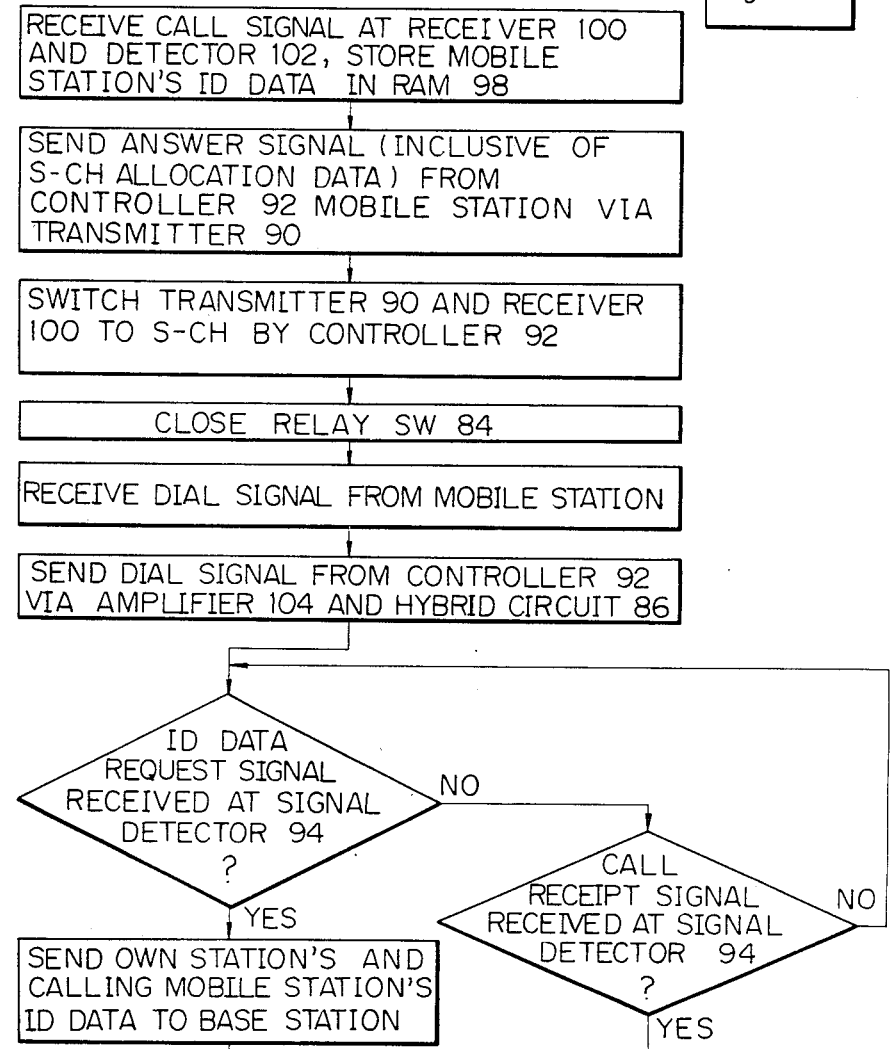

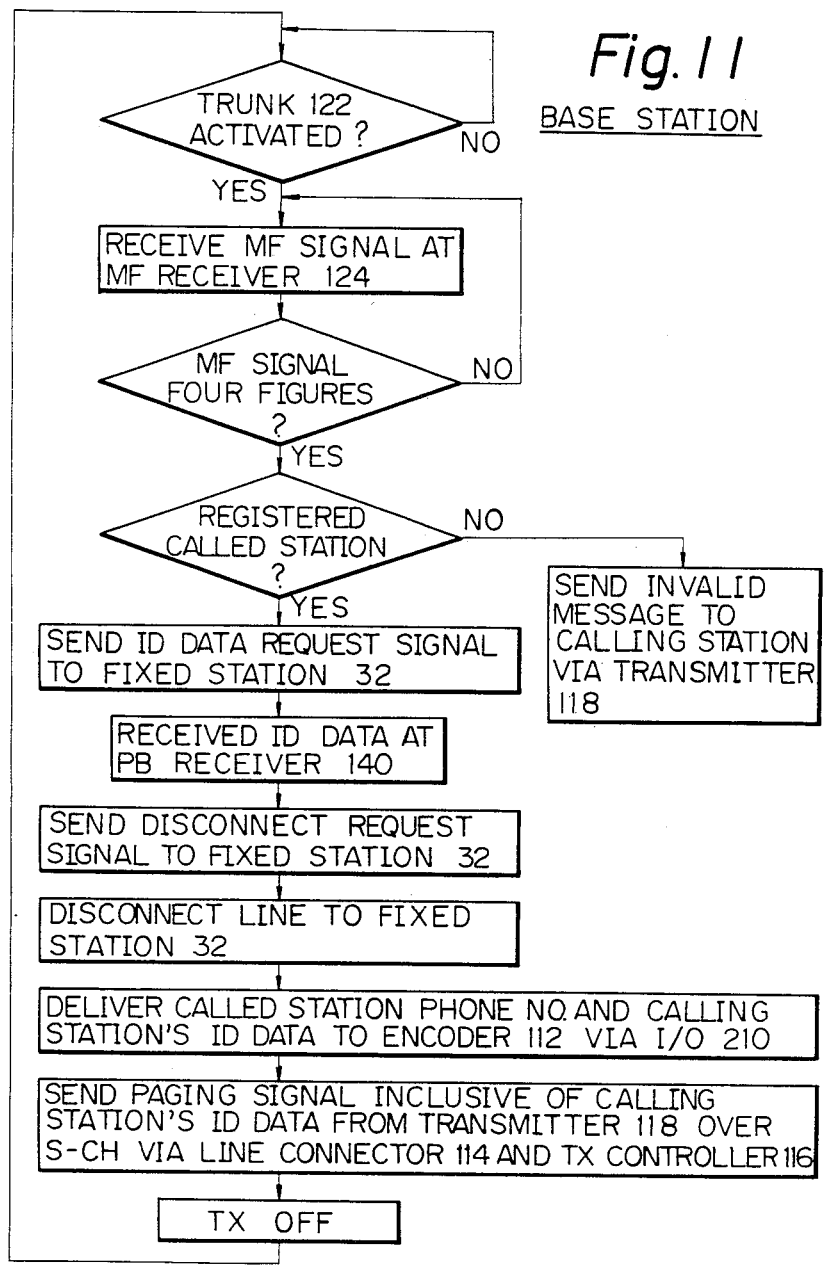

MOBILE RADIO COMMUNICATIONS SYSTEM

BACKGROUND OF THE INVENTION

The present invention relates to a wide area mobile communications system and, more particularly, to a mobile communications system which allows any remote mobile stations to hold communication with each other through a public switching network.

A cordless telephone has been known which is a radio telephone unit connecting to a subscriber's line. The problem with the cordless telephone is that it does not work when brought out of a narrow predetermined service area and, outside the service area, its role has to be fulfilled by alternative means such as a public telephone. While a wide area radio communications service may be implemented by a paging receiver or pager, the function assigned to a pager is only receiving a call and not originating a call; for originating a call, a public telephone or like means has to be relied on.

One possible approach for a wide area telephone service is a hybrid system which employs a cordless telephone for originating a call and a pager for recognizing receipt of a call. Specifically, a transmission base station which governs a wide area calls up a mobile station through a pager, while the mobile station originates a call for any of fixed stations distributed in a plurality of narrow areas. An example of such a hybrid system is shown in FIG. 1. The system in FIG. 1 includes a public switching network 10, a subscriber's line 12, a public telephone line 14, and a transmission base station 16. The operation of the system will be described assuming a case wherein a mobile station 22 operable in a certain specific area $S_1$ is to call up another mobile station 18 which is connected by radio to a fixed station 20 which in turn is connected to the public telephone line 14 or the like.

The mobile station 22 starts the communication with connecting itself to a fixed station 24 over a radio channel to thereby transmit a signal for calling the mobile station 18 to the exchange 10 over the subscriber's line 12. Then, the exchange 10 sends a page instruction to the base station 16 so as to cause it to transmit a call signal assigned to the mobile station 18. When the mobile station 18 is called by the call signal from the base station 16, a person at the mobile station 18 originates a call for the calling mobile station. The call signal from the mobile station 18 is received by the fixed station 20 which is allocated to the specific area $S_2$. Then, the fixed station 20 is connected to the fixed station 24 via the exchange 10, whereby communication is set up between the mobile stations 18 and 22.

However, a problem arises when both the mobile stations to originate a call and receive a call are of the kind which is connectable to a public telephone line or the like. Assume a case wherein, as shown in FIG. 2, a mobile station 34 located in an area $S_3$ governed by a fixed station 32 which is connected to a public telephone line 28 intends to call up a mobile station 38 located in an area $S_4$ governed by a fixed station 36 which is also connected to a public telephone line 30. The procedure from the origination of a call at the mobile station 34 to the receipt of a call at the mobile station 38 is the same as in FIG. 1. However, despite the call meant for the mobile station 34, it is routed to the mobile station 34 by way of the exchange 10 and then the base station 16 by a radio wave 40, preventing the connection from being established for ever.

SUMMARY OF THE INVENTION

It is therefore an object of the present invention to provide a mobile radio communications system which enables communication to be held between any remote mobile stations by supplying a called mobile station identification data associated with a fixed station which covers a specific area in which a calling mobile unit is located.

It is another object of the present invention to provide a generally improved mobile radio communications system.

A mobile radio communications system of the present invention comprises a plurality of fixed stations connected to a subscriber's line of a switching network, a mobile station connectable to any one of said fixed stations by radio, and a transmission base station for paging the mobile station. Each of the fixed stations comprises a device for sending to an exchange identification data associated with the mobile station and identification data associated with the one fixed station upon origination of a call by the mobile station. The transmission base station comprises a device for transmitting to a mobile station to be called a paging signal and the identification data associated with the calling mobile station and the identification data associated with the fixed station. The mobile station comprises a device for displaying a call in response to the paging signal from the transmission base station, and a device for displaying the calling mobile station represented by the identification data from the transmission base station. The mobile station is constructed to send an answer to the paging from the transmission base station by way of another one of the fixed stations which is connected by radio with the called mobile station, thereby enabling the calling mobile station and the called mobile station to be connected with each other.

Preferably, the transmission base station further comprises a device for sending a disconnect request signal to the fixed station associated with the calling mobile station in response to a call request from the fixed station, and the fixed station further comprises a device for disconnecting a line to the transmission base station upon receipt of the disconnect request signal while holding a radio channel with the mobile station connected.

Desirably, the mobile station is further constructed to store the identification data associated with the calling mobile station while displaying the identificaton data, and automatically send a call signal to the calling mobile station through a recall switch.

The above and other objects, features and advantages of the present invention will become apparent from the following detailed description taken with the accompanying drawings.

BRIEF DESCRIPTION OF THE DRAWINGS

FIG. 6 is a flowchart demonstrating the operation of a calling mobile station in accordance with the present invention;

FIGS. 7A and 7B are a flowchart demonstrating the operation of a calling fixed station;

FIG. 8 is a flowchart demonstrating the operation of the base station;

FIG. 9 is a flowchart demonstrating the operation of a called fixed station;

FIGS. 10A and 10B are a flowchart demonstrating the operation of a calling fixed station;

FIG. 11 is a flowchart associated with the base station;

DESCRIPTION OF THE PREFERRED EMBODIMENTS

While the mobile radio communications system of the present invention is susceptible of numerous physical embodiments, depending upon the environment and requirements of use, substantial numbers of the herein shown and described embodiments have been made, tested and used, and all have performed in an eminently satisfactory manner.

Figure 1:
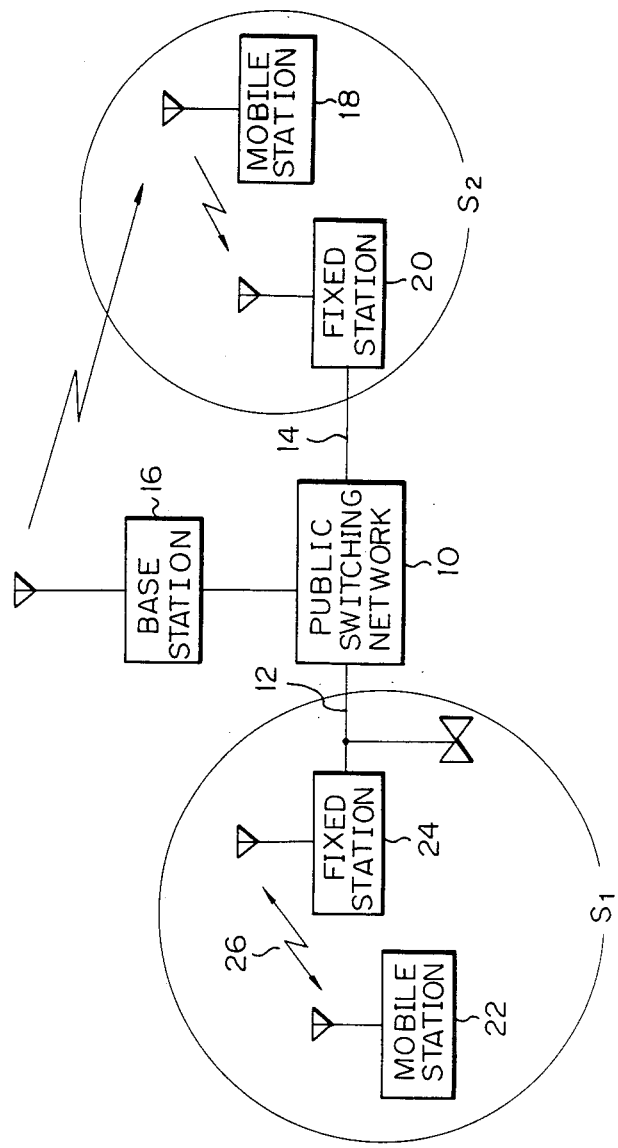
FIG. 1 is a schematic diagram of an exemplary mobile radio communications system useful for the description of the present invention.
Figure 2:
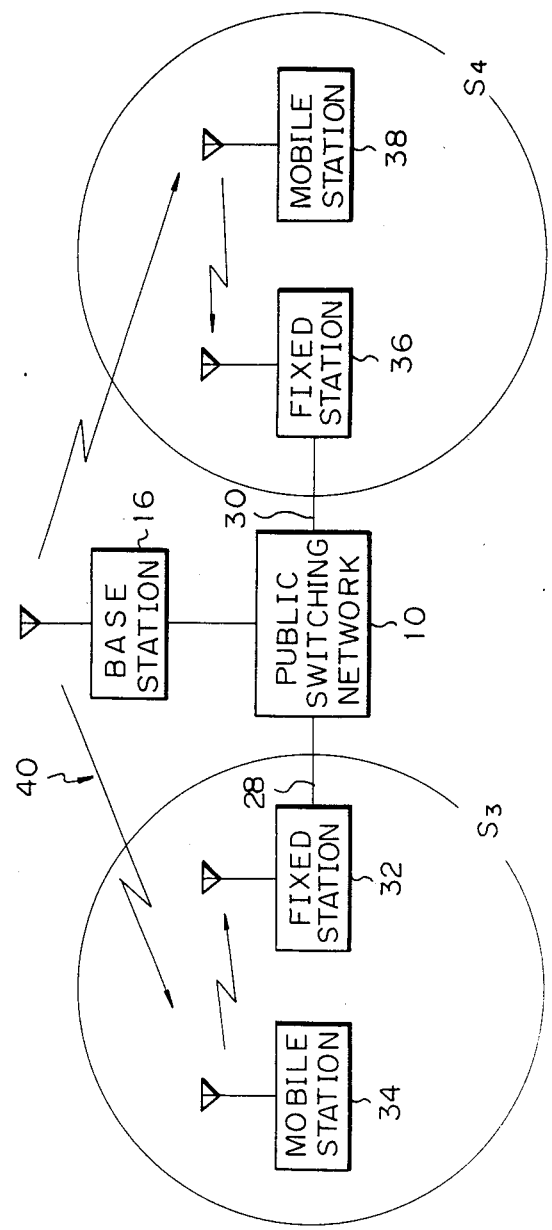
FIG. 2 is a schematic diagram of a mobile radio communications system embodying the present invention.
Figure 3:
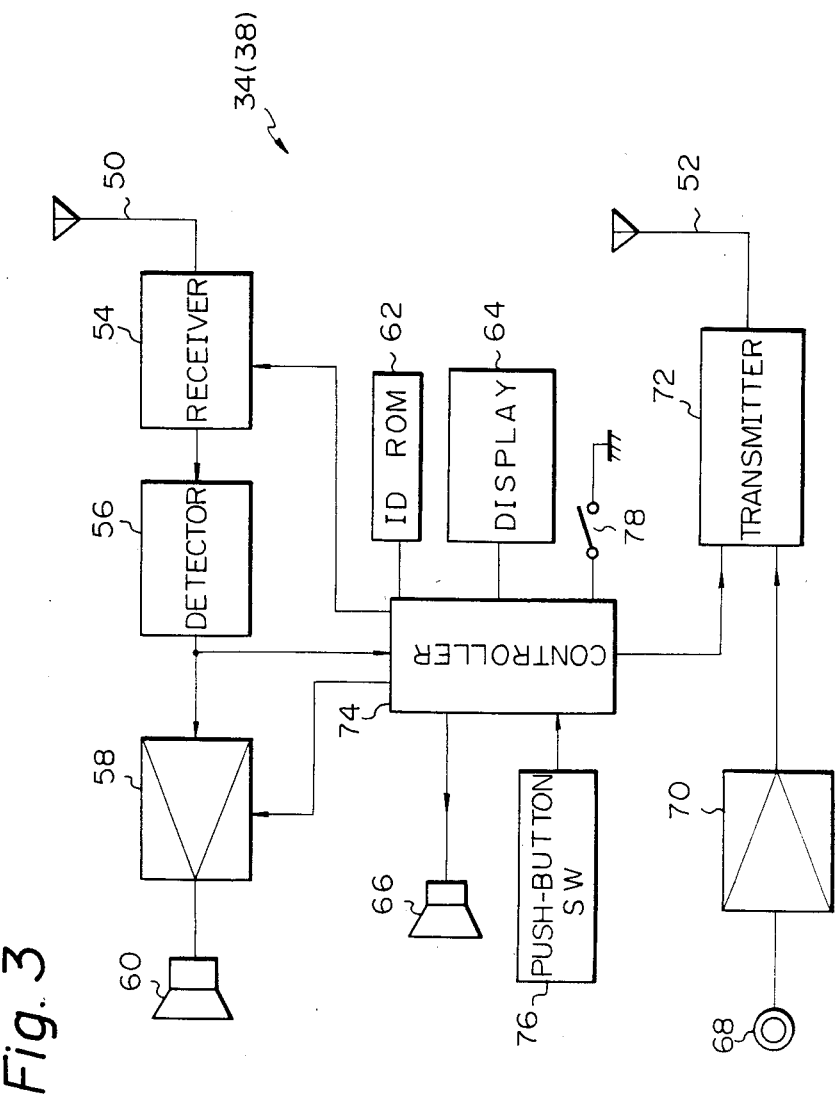
FIG. 3 is a block diagram of a mobile station in accordane with the present invention.
Figure 4:
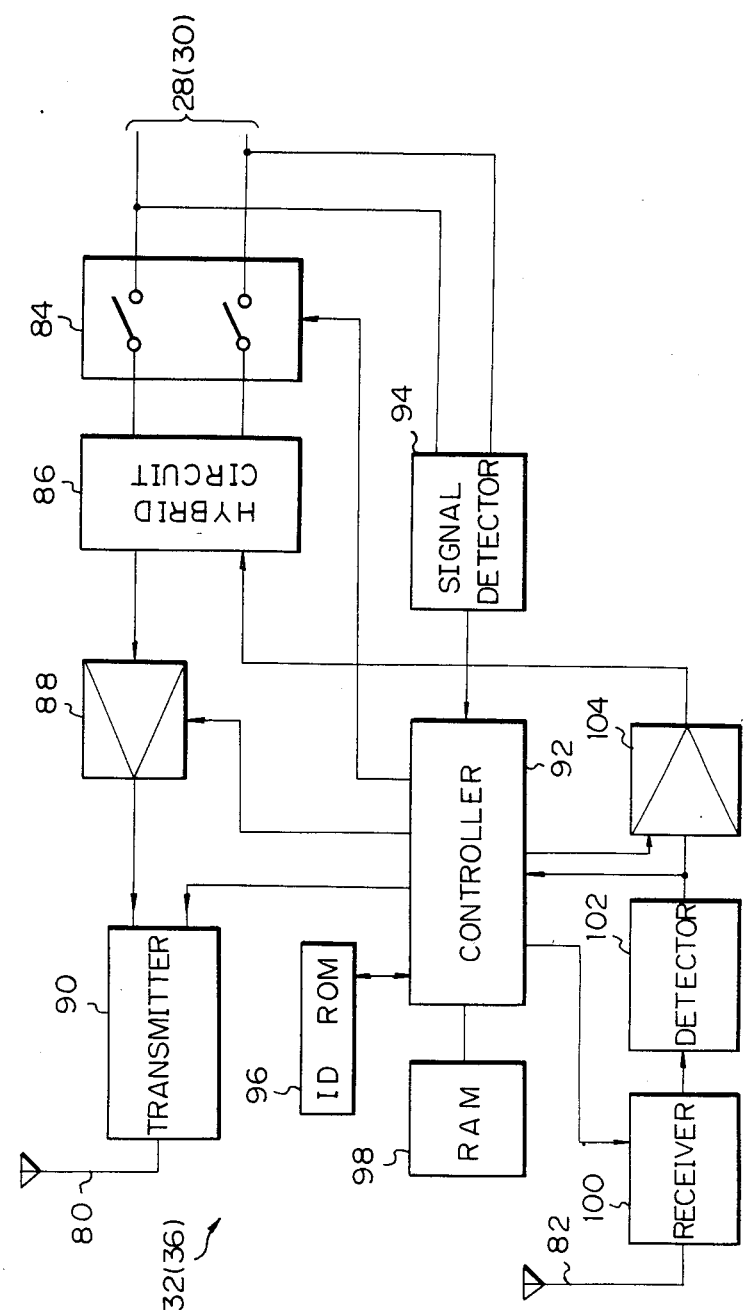
FIG. 4 is a block diagram of a fixed station in accordance with the present invention.
Figure 5:
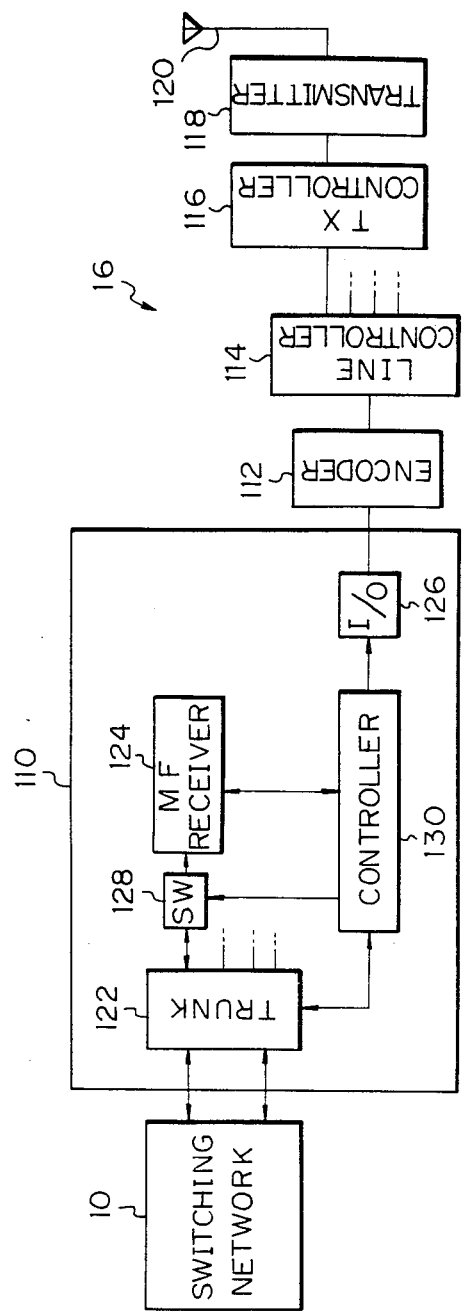
FIG. 5 is a block diagram of a transmission base station included in the system of FIG. 2.
Figure 7B:
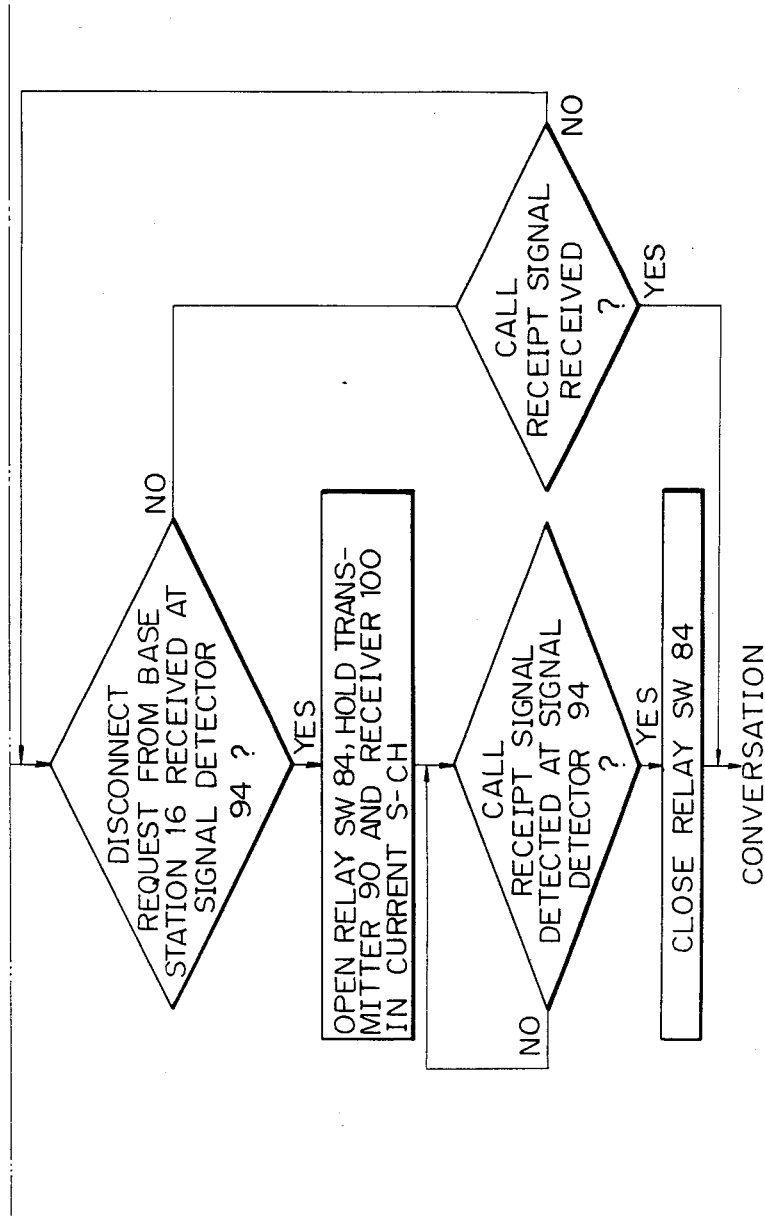

Again, let it be assumed in FIG. 2 that the mobile station located in the service area $S_3$ is to originate a call for the mobile station 38 located in the service area $S_4$. Specific constructions of a mobile station, fixed station and transmission base station in accordance with the present invention are shown in FIGS. 3, 4 and 5, respectively, and details thereof will be described later.

First, the mobile station 34 originates a call for the fixed station 32 assigned to the service area $S_3$ so as to connect itself by radio to the latter. The mobile station 34 sends to the fixed station 32 a telephone number inputted by a person at the mobile station 34. Then, the fixed station 32 transmits to the transmission base station 16 via the switching network 10 identification (ID) data assigned to the mobile station 34 and ID data assigned to itself together with the telephone number. In response to the input signal, the base station 16 sees if the called mobile station is a registered station and, then, delivers a disconnect request signal to the fixed station 32. The fixed station 32 responds to the disconnect request signal by disconnecting the line which connects it to the base station 16, while holding the radio connection with the mobile station 34.

The base station 16 transmits to the called mobile station 38 a paging signal and the ID information associated with the calling mobile station 34 and with the fixed station 32 which covers the area $S_3$. In response to this signal, the mobile station 38 rings a bell to inform a person thereat of the receipt of a call and, at the same time, displays the ID information associated with the calling station 34 and the fixed station 32. This allows the person at the called station 38 to see that the mobile station 34 has been connected to the fixed station 32 by radio. What follows this is an ordinary calling operation performed by a mobile unit.

The mobile station 38 is brought into connection with the fixed station 36 by radio. Then, the person at the mobile station 38 dials a telephone number assigned to the fixed station 32, thereby performing a call receipt operation meant for the fixed station 32 via the exchange 10. As the fixed station 32 detects a call receipt signal, the mobile station 38 is connected to the mobile station 34 via the fixed station 32.

Referring to FIG. 3, an exemplary construction of the mobile station in accordance with the present invention is shown. The mobile station comprises an antenna 50 for receipt, an antenna 52 for transmission, a receiver 54 connected with the antenna 50, a detector 56 for detecting an output signal of the receiver 54, an amplifier 58 for amplifying an output signal of the detector 56, an earpiece 60 for outputting a speech signal from the amplifier 58. The mobile station also comprises an ID read only memory (ROM) 62 for storing ID data associated with the own station, a display 64 for displaying ID data representative of a calling remote mobile station and a fixed station, and a bell 66 for notifying receipt of a call. The mobile station further comprises a mouthpiece 68, an amplifer 70 for amplifying an output signal of the mouthpiece 68, a transmitter 72 for transmitting a speech signal outputted from the amplifier 70 or a control signal from a controller 74, a push-button switch 76 for dialing, and a hook switch 78. The controller 74 is adapted to set channels of the transmitter 72 and reciever 54, control the gain of the amplifier 58, and govern the control flow at the mobile station.

The fixed station in accordance with the present invention may be constructed as shown in FIG. 4. As shown, the fixed station comprises an antenna 80 for transmission, an antenna 82 for receipt, a relay switch 84 connectable to a public telephone line, a hybrid circuit 86, an amplifier 88 for amplifying a speech signal outputted from the hybrid circuit 86, a transmitter 90 for transmitting through the antenna 80 a speech signal from the amplifier 88 or a control signal from a controller 92, and a signal detector 94 for picking up a call receipt signal or a disconnect request signal from the telephone line. The fixed station also comprises an ID ROM 96 for storing an ID code assigned to the own station, and a random access memory (RAM) 98 for storing ID data associated with a mobile station. The fixed station further comprises a receiver 100 connected to the antenna 82, a detector 102 for detecting an output signal of the receiver 100, and an amplifier 104 for amplifying a speech signal outputted from the detector 102 or a control signal from the controller 92. The controller 92 serves to set channels of the transmitter 90 and receiver 100 and govern the control flow at the fixed station.

Referring to FIG. 5, the transmission base station 16 shown in FIG. 2 comprises an exchange 110 for paging, an encoder 112 for encoding ID data associated with a called mobile station and those associated with a calling mobile station, a line connector 114 for transmitting an output signal of the encoder 112 to each transmitter, a TX controller 116 for delivering a signal from the line connector 114 to a transmitter 118, and an antenna 120. The paging exchange 110 includes a trunk 122, an MF receiver 124 for receiving an MF signal from the exchange 110, an I/O interface 126 to the encoder 112, a switch 128 for switching transmission and receipt of a signal by the exchange 110 to and from the switched network, and a controller 130 for govering the control flow at the exchange 110.

The flowcharts shown in FIGS. 6, 7, 8 and 9 represent respectively the operations of the calling mobile station, calling fixed station, base station and called mobile station each having the construction discussed above. In FIG. 9, a call origination flow to be performed by a person after the final step is common to that performed at the calling mobile station as shown in FIG. 6 except that the telephone number to be entered is the ID data associated with the displayed fixed station.

The operation flow will be described in detail.

STEP 1: A person at the calling mobile station 34 off-hooks the telephone.

STEP 2: The station 34 detects the off-hooking and, then, transmits a calling signal inclusive of the own station's ID data from the controller 74 to the calling fixed station 32 via the transmitter 72 (C-CH). The fixed station 32 receives the calling signal at the receiver 100 and detector 102 and stores the ID data associated with the station 34 in the RAM 98.

STEP 3: The fixed station 32 delivers an answer signal (inclusive of S-CH allocation data) to the mobile station 34 from the controller 92 via the transmitter 90. The mobile station 34 receives the answer signal.

STEP 4: Both the mobile station 34 and the fixed station 32 are switched to S-CH which is specified by the S-CH allocation data.

STEP 5: The fixed station 32 closes the relay switch 84 to connect itself to the switching network.

STEP 6: The person at the mobile station 34 enters the telephone number of the desired remote station 38 through the push-button switch 76.

STEP 7: The mobile station 34 transmits a dial signal from the controller 74 via the transmitter 72 and, then, awaits in the S-CH.

STEP 8: The fixed station 32 receives the dial signal from the mobile station 34.

STEP 9: The fixed station 32 delivers the own station's ID data and ID data associated with the mobile station to the switching network from the controller 92 via the amplifer 104 and hybrid circuit 86.

STEP 10: When connected with the fixed station 32 via the exchange 10, the transmission base station 16 activates its trunk 122 so that the MF receiver 124 receives the called station's telephone number, ID data of the fixed station 32 and ID data of the mobile station 34 (then in an MF format).

STEP 11: Upon receipt of all the data, the base station 16 checks whether the called station's telephone number is registered one and, if so, sends a disconnect request signal from the controller 130 to the fixed station 32 and, if not, an INVALID message.

STEP 12: The fixed station 32 receives the disconnect request signal at the signal detector 94.

STEP 13: The fixed station 32 opens the relay switch 84 to disconnect the line to the base station 16, while its radio section including the transmitter 90 and receiver 120 hold the existing S-CH. The base station 16, too, disconnects the line to the fixed station 32.

STEP 14: The base station 16 applies the called station's telephone number and the calling station's ID data to the encoder 112 via the exchange 110.

STEP 15: The base station 16 transmits a paging signal inclusive of the calling station's ID data over P-CH from the transmitter 118 via the line connector 114 and TX controller 116, thereafter turning off the TX.

STEP 16: The called mobile station is in a waiting state in the P-CH and, in response to a call from the base station 16, receives the paging signal at the receiver 54 and detector 56.

STEP 17: The mobile station 38 sees if the call is meant therefor and, if so, rings the bell 66 while displaying the ID data of the mobile station 34 and that of the fixed station 32 on the display 64.

STEP 18: A person at the mobile station 38 recognizes receipt of the call and off-hooks the telephone for making a recall.

STEP 19: The mobile station 38 executes the previously described STEPS 2-5, which were performed by the mobile station 34, with the called fixed station 36.

STEP 20: The person at the mobile station 38 dials through the push-button switch 76 a telephone number assigned to the calling fixed station 32 which governs the area where the calling mobile station 34 is located.

STEP 21: The called mobile station 38 applies a dial signal to the exchange 10 from the controller 74 via the transmitter 72.

STEP 22: The exchange 10 transmits a receipt signal to the calling fixed station 32.

STEP 23: The fixed station 32 detects the receipt signal at the signal detector 94 and, then, closes the relay switch 84.

STEP 24: The connection between the calling and called fixed stations 32 and 36 is set up to enable the calling and called mobile stations 34 and 38 to hold communcations therebetween.

Figure 10B:
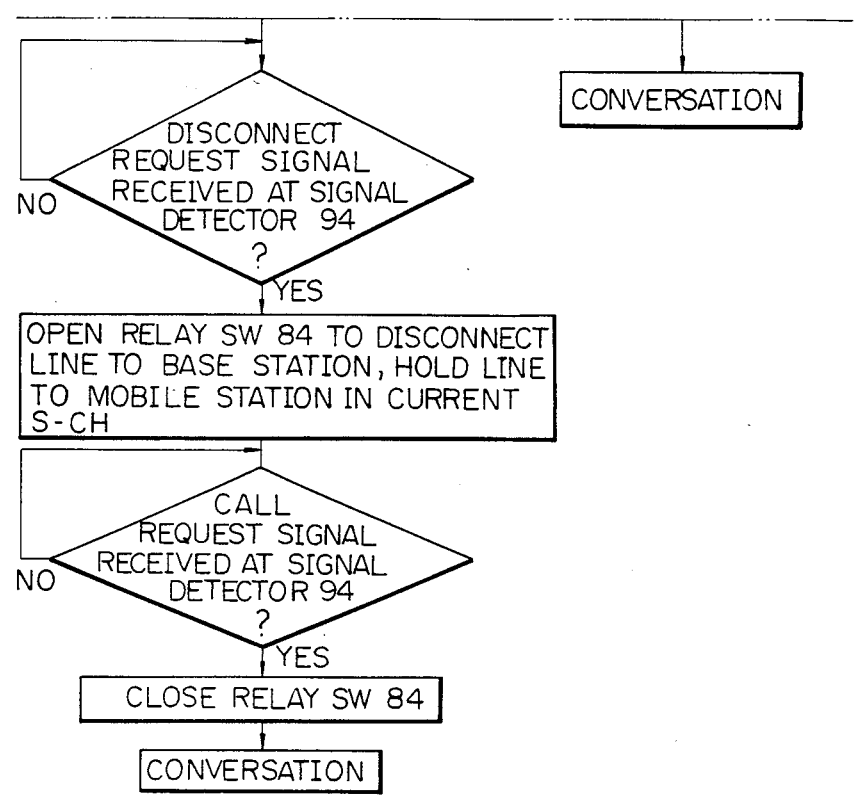
Figure 12:
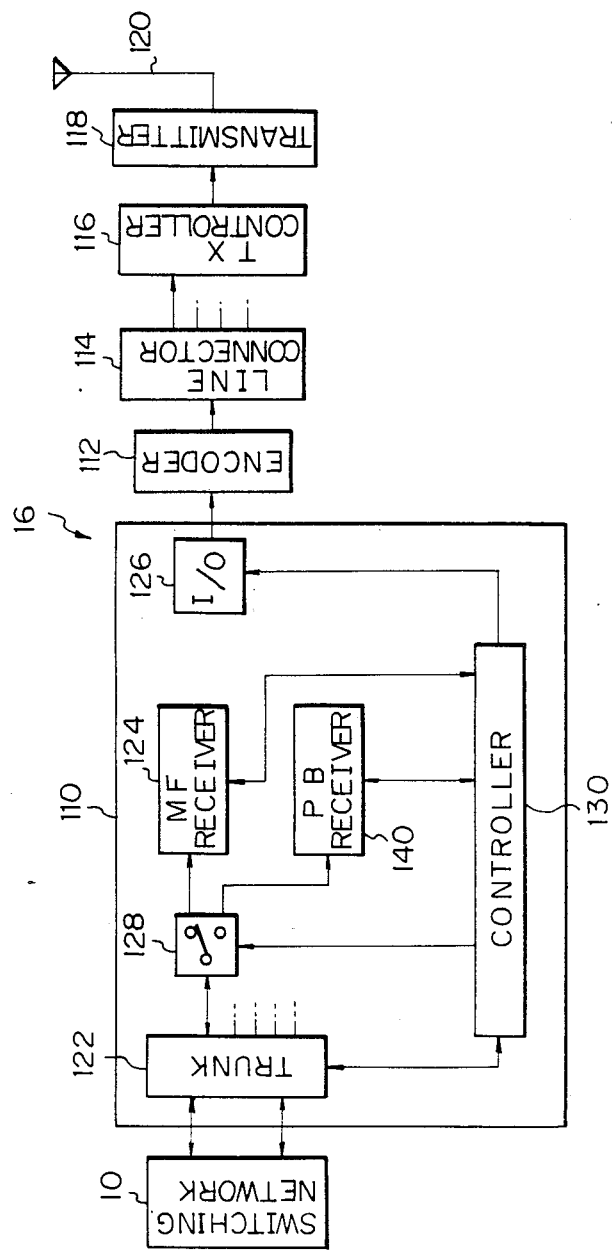
FIG. 12 is a block diagram showing an alternative construction of the base station in accordance with the present invention.

The transmission of the ID data from the calling fixed station 32 to the base station 16 may be implemented by an alternative procesure in which the fixed station 32 sends a dial signal to the base station 16, then awaits an ID data request signal from the base station 16, and then sends ID data to the base station 16. In such a case, the fixed station 32 and the base station 16 will operate as shown in FIGS. 10 and 11, respectively. The base station 16 may be provided with the construction shown in FIG. 12, which includes a PB receiver for receiving a PB signal from the fixed station 32 in addition to those structural elements shown in FIG. 5.

In the flowcharts shown in FIGS. 10 and 11, STEPS 1-8 and STEPS 12-24 proceed in exactly the same sequence as the STEPS 1-8 and STEPS 12-24 previously described in conjunction with the first embodiment, while the following STEPS 25-31 are inserted between the STEPS 8 and 12.

STEP 25: The calling fixed station 32 transmits a dial signal from the controller 92 via the amplifer 104 and hybrid circuit 86.

STEP 26: When the base station 16 has been connected with the fixed station 32 via the exchange 10, its trunk 122 is activated so that the MF receiver 124 receives the called station's telephone number (MF signal).

STEP 27: The base station 16 upon receipt of the called station's telephone number (four figures) checks whether the telephone number is registered one and, if so, sends an ID data request signal to the fixed station 32 from the PB receiver 140 and, if not, an INVALID message.

STEP 28: The fixed station 32 receives the ID data request signal at the signal detector 94.

STEP 29: The fixed station 32 transmits ID data (PB signal) associated with the calling fixed station 32 and mobile station 34 to the base station 16.

STEP 30: The base station 16 receives the ID data at the PB receiver 140.

STEP 31: The base station 16 sends a disconnect request signal to the fixed station 32.

Figure 13:
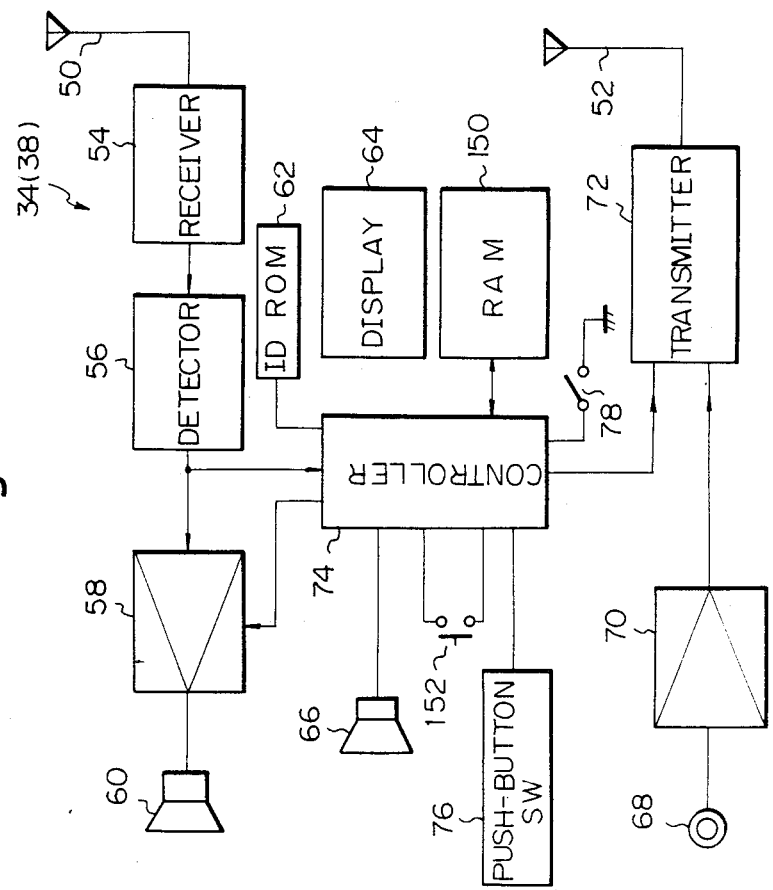
FIG. 13 is a block diagram showing an alternative construction of the mobile station in accordance with the present invention.

Further, the called mobile station 38 may be constructed such that upon receipt of a paging signal it stores the ID data associated with the calling moble station 34 and that associated with the fixed station 32 in an internal store and, when a recall switch 152 (FIG. 13) is depressed, automatically sends the stored ID data. For such an application, the mobile station may be constructed as shown in FIG. 13. The mobile station shown in FIG. 13 includes, in addition to the elements shown in FIG. 3, a RAM 150 for storing the incoming ID data and the above-mentioned recall switch 152.

In summary, it will be seen that the present invention provides a mobile radio communications system which enables any remote mobile stations to hold communications with each other to thereby provide a wider communications service area and greater convenience.

Various modiciations will become possible for those skilled in the art after receiving the teachings of the present disclosure without departing from the scope thereof.

What is claimed is:

1. A mobile radio communications system, comprising:

a plurality of fixed stations connected to a subscriber's line of a swiching network, a mobile station connectable to any one of said fixed stations by radio, and a transmission base station for paging said mobile station;

each of the fixed stations comprising means for sending to an exchange identification data associated with the mobile station and identification data associated with said one fixed station upon origination of a call by the mobile station;

the transmission base station comprising means for transmitting to a mobile station to be called a paging signal and the identification data associated with the calling mobile station and the identification data associated with the fixed station;

the mobile station comprising means for displaying a call in response to the paging signal from the transmission base station, and means for displaying the calling mobile station represented by the identification data from the transmission base station, the mobile station being constructed to send an answer to the paging from the transmission base station by way of another one of the fixed stations which is connected by radio with the called mobile station, thereby enabling the calling mobile station and the called mobile station to be connected with each other.

2. A mobile radio communications system as claimed in claim 1, wherein the transmission base station further comprises means for sending a disconnect request signal to the fixed station associated with the calling mobile station in response to a call request from the fixed station, and the fixed station further comprises means for disconnecting a line to the transmission base station upon receipt of the disconnect request signal while holding a radio channel with the mobile station connected.

3. A mobile radio communications system as claimed in claim 1, wherein the mobile station is further constructed to store the identification data associated with the calling mobile station while displaying the identification data, and automatically send a call signal to the calling mobile station through a recall switch.

* * * * *